(12) United States Patent
Jang et al.

(10) Patent No.: US 7,339,001 B2
(45) Date of Patent: Mar. 4, 2008

(54) THERMOPLASTIC RESIN COMPOSITIONS

(75) Inventors: Young Gil Jang, Gyeonggi-do (KR); Sung Hee Ahn, Seoul (KR); Su Hak Bae, Seoul (KR); Sang Hyun Hong, Gyeonggi-do (KR)

(73) Assignee: Cheil Industries Inc., Seoul (KR)

( * ) Notice: Subject to any disclaimer, the term of this patent is extended or adjusted under 35 U.S.C. 154(b) by 0 days.

(21) Appl. No.: 10/512,784

(22) PCT Filed: Feb. 20, 2003

(86) PCT No.: PCT/KR03/00345

§ 371 (c)(1),
(2), (4) Date: Oct. 26, 2004

(87) PCT Pub. No.: WO03/091332

PCT Pub. Date: Nov. 6, 2003

(65) Prior Publication Data

US 2005/0228131 A1    Oct. 13, 2005

(30) Foreign Application Priority Data

Apr. 26, 2002  (KR) .................. 10-2002-0022864

(51) Int. Cl.
*C08F 283/08*    (2006.01)
*C08K 3/02*    (2006.01)
*C08L 73/00*    (2006.01)

(52) U.S. Cl. .................. 524/508; 524/80; 525/96; 525/98; 525/99

(58) Field of Classification Search ............... 524/508, 524/80; 525/96, 98, 99
See application file for complete search history.

(56) References Cited

U.S. PATENT DOCUMENTS

| | | | |
|---|---|---|---|
| 3,231,635 A | 1/1966 | Holden et al. | |
| 3,251,905 A | 5/1966 | Zelinski | |
| 3,383,435 A | 5/1968 | Cizek | |
| 3,431,323 A | 3/1969 | Jones | |
| 3,883,613 A | 5/1975 | Cooper | |
| 4,172,826 A * | 10/1979 | Haaf et al. .................. | 524/141 |
| 4,360,618 A | 11/1982 | Trementozzi | |
| 4,526,917 A | 7/1985 | Axelrod | |
| 4,578,423 A | 3/1986 | Deets et al. | |
| 4,599,380 A | 7/1986 | Ueda et al. | |
| 4,966,814 A | 10/1990 | Ohzeki | |
| 6,646,032 B2 | 11/2003 | Lee et al. | |
| 6,716,900 B2 | 4/2004 | Jang et al. | |
| 6,838,497 B2 | 1/2005 | Hong et al. | |
| 2005/0148708 A1 | 7/2005 | Ahn et al. | |

FOREIGN PATENT DOCUMENTS

| | | |
|---|---|---|
| DE | 198 60 509 A1 | 3/2000 |
| EP | 0 359 469 A2 | 3/1990 |
| EP | 1 069 1587 A1 | 1/2001 |
| JP | 07-48491 | 2/1995 |
| JP | 09-259796 | 10/1996 |
| JP | 09-137032 | 5/1997 |
| JP | 9-183886 | 9/1997 |
| KR | 2001-55739 | 7/2001 |
| KR | 2001-107434 | 12/2001 |

OTHER PUBLICATIONS

Abstract of JP Laid Open Application 9-183886 published Jul. 15, 1997.
Abstract of Korea Laid Open Application 2001-107434 published Dec. 7, 2001.
Abstract of Korea Laid Open Application 2001-55739 published Jul. 4, 2001.
Abstract of German Patent Application DE 198 60 509 published Mar. 9, 2000.
Abstract of JP Laid Open Application 07-048491 published Feb. 21, 1995.
Abstract of JP Laid Open Application 09-259796 published Oct. 8, 1996.
Abstract of JP Laid Open Application 09-137032 published May 27, 1997.

* cited by examiner

*Primary Examiner*—Kriellion A Sanders
(74) *Attorney, Agent, or Firm*—Maria Parrish Tungol

(57) ABSTRACT

The thermoplastic resin composition according to the present invention comprises (A) about 20~95 parts by weight of a rubber-modified polystyrene resin composed of ($a_1$) about 10~60% by weight of a styrene-containing graft copolymer resin containing about 10~60% by weight of a rubber and about 90~40% by weight of a styrene-acrylonitrile copolymer, the styrene-acrylonitrile copolymer containing about 0.5~10% by weight of acrylonitrile, and ($a_2$) about 90~40% by weight of a styrene-containing copolymer resin containing 0~20% by weight of a rubber; and (B) about 5~80 parts by weight of a polyphenylene ether.

20 Claims, No Drawings

THERMOPLASTIC RESIN COMPOSITIONS

FIELD OF THE INVENTION

The present invention relates to a thermoplastic resin composition. More particularly, the present invention relates to a thermoplastic resin composition that comprises a rubber-modified styrene-containing resin containing 0.5-10% by weight of acrylonitrile and a polyphenylene ether resin.

BACKGROUND OF THE INVENTION

Polyphenylene ether resin has good thermal resistance, high impact strength, and good dimensional stability. However, polyphenylene ether resin has poor processability due to its excessively high thermal resistance. Therefore, the polyphenylene ether resin is blended with a polystyrene resin which has good compatibility with polyphenylene ether resin to improve processability for use of housing materials in electrical apparatuses. However, the disadvantage could be observed that the blend of polyphenylene ether resin and polystyrene has poor impact strength. In order to overcome the shortcoming, a rubber-reinforced polystyrene resin is used instead of polystyrene resin. However, although the impact strength of the resin composition is improved, the resin has decreased molding property and poor surface gloss.

U.S. Pat. No. 3,383,435 discloses blends of polyphenylene ether and one or more styrene resins having improved processablity and chemical resistance. Further, U.S. Pat. No. 4,360,618 discloses a polyphenylene ether blended with SAN or ABS polymers containing from 2~8% by weight of acrylonitrile. However, these resin compositions have insufficient appearance, impact strength, and molding property.

Accordingly, the present inventors have developed thermoplastic resin compositions which has a good surface gloss, impact strength, and molding property by adding a rubber-modified styrene-containing resin containing 0.5-10% by weight of acrylonitrile to a polyphenylene ether resin.

OBJECTS OF THE INVENTION

An object of the present invention is to provide thermoplastic resin compositions with good surface gloss, impact strength, and molding property.

Other objects and advantages of this invention will be apparent from the ensuing disclosure and appended claims.

SUMMARY OF THE INVENTION

A thermoplastic resin compositions according to the present invention comprise (A) 20~95 parts by weight of a rubber-modified styrene-containing resin composed of ($a_1$) 10~60% by weight of a styrene-containing graft copolymer resin containing 10~60% by weight of a rubber and 90~40% by weight of a styrene-acrylonitrile copolymer, wherein the styrene-acrylonitrile copolymer contains 0.5~10% by weight of acrylonitrile, and ($a_2$) 90~40% by weight of a styrene-containing copolymer containing 0~20% by weight of a rubber; and (B) 5~80 parts by weight of a polyphenylene ether.

DETAILED DESCRIPTION OF THE INVENTION (A) Rubber-Modified Styrene-Containing Resin The rubber modified styrene-containing resin according to the present invention is a polymer wherein rubber phase polymers are dispersed in the form of particles in a matrix obtained by polymerizing an aromatic vinyl monomer and a vinyl group containing monomer, which can be polymerized therewith in the presence of a rubber phase polymer. Such rubber-modified styrene-containing resin is prepared by a known method such as emulsion polymerization, suspension polymerization or bulk polymerization, and is conventionally produced by an extrusion with a styrene-containing graft copolymer resin and a styrene-containing copolymer resin. In a bulk polymerization, both a styrene-containing graft copolymer resin and a styrene-containing copolymer resin are prepared together in one process. In other polymerizations, a styrene-containing graft copolymer resin and a styrene-containing copolymer resin may be prepared separately. In either case, the contents of rubber in a final rubber-modified styrene-containing resin to the total weight of the base resin are preferably in 5 to 30 parts by weight. Examples of such resins are acrylonitrile-butadiene-styrene (ABS) copolymer resin, acrylonitrile-acryl rubber-styrene (AAS) copolymer resin, acrylonitrile-ethylenepropylene rubber-styrene (AES) copolymer resin, and the like.

In this invention, the rubber modified styrene-containing resin (A) is prepared by mixing 10~60% by weight of the styrene-containing graft copolymer resin ($a_1$) with 90~40% by weight of thy styrene-containing copolymer resin ($a_2$).

($a_1$) Styrene-Containing Graft Copolymer Resin

Examples of a rubber for styrene-containing graft copolymer resin are diene rubbers such as polybutadiene, poly(styrene-butadiene), poly(acrylonitrile-butadiene), etc; a saturated rubber in which hydrogen is added to said diene-containing rubber; isoprene rubber; a polybutyl acrylic acid; and a terpolymer of ethylene-propylene-diene (EPDM). It is preferable to use a diene-containing rubber, more preferably a butadiene-containing rubber. The content of rubber in the graft copolymer-resign is preferably in the range of 10 to 60% by weight based on the total weight of a graft copolymer resin.

Examples of aromatic vinyl-containing monomers are styrene, α-methyl styrene, p-methyl styrene, etc. In the above examples, styrene is the most preferable. At least one copolymerizable monomer may be introduced and applied to the aromatic vinyl monomers. It is preferred that the copolymerizable monomer is a cyanide vinyl-containing compound such as acrylonitrile or an unsaturated nitrile-containing compound such as methacrylonitrile.

The graft copolymer of the present invention is prepared by copolymerizing 10~60% by weight of rubber with 90~40% by weight of the monomer mixture. The monomer mixture contains 90 to 99.5% by weight of aromatic vinyl monomer such as styrene and 0.5 to 10% by weight of unsaturated nitrile monomer. It is preferable that the monomer mixture contains 93 to 99.5% by weight of aromatic vinyl monomer and 0.5 to 7% by weight of unsaturated nirtile monomer, more preferably 95 to 99% by weight of aromatic vinyl monomer and 1 to 5% by weight of unsaturated nirtile monomer.

In addition, in order to give good characteristics of processability and heat resistance, the monomers such as acrylic acid, methacryl acid, maleic anhydride and N-substituted maleimide can be added in the graft polymerization.

The amounts of the monomers are in the range of 0 to 40% by weight based on the styrene-containing graft copolymer resin.

To acquire good impact strength and surface appearance when said styrene-containing graft copolymer is prepared, the average size of rubber particles is preferably in the range of from 0.1 to 0.5 μm.

($a_2$) Styrene-Containing Copolymer Resin

The polystyrene resin of the present invention is prepared by emulsion polymerization, suspension polymerization, bulk polymerization or a combination thereof For example, the polystyrene-containing resin is prepared by adding 80~100% by weight of an aromatic alkenyl compounds, e.g. styrene or a mixture of aromatic alkenyl monomer and alkylester monomer of an acrylic acid or a methacrylic acid: to 0~20% by weight of rubber selected from the group comprising of a butadiene rubber, an isoprene rubber, a copolymer of a butadiene and a styrene, and an alkyl acrylate rubber and bulk-polymerizing by use of one of more initiators selected from the group consisting of benzoylperoxide, t-butyl hydroperoxide, acetyl peroxide, and cumene hydroperoxide.

In the present invention, polystyrene which does not contain rubber or rubber-reinforced polystyrene may be used alone or in combination.

In this invention, the rubber modified styrene-containing resin (A) is composed of 10~60% by weight of the styrene-containing graft copolymer resin ($a_1$) and 90~40% by weight of the styrene-containing copolymer resin ($a_2$).

(B) Polyphenylene Ether Resin

The Polyphenylene ether resin is employed as a base resin to improve flame retardancy, heat resistance and rigidity of the resin composition according to the present invention. As examples of the polyphenylene ether resin, poly(2,6-dimethyl-1,4-phenylene)ether, poly(2,6-diethyl-1,4-phenylene) ether, poly(2,6-dipropyl-1,4,-phenylene)ether, poly(2-methyl-6-ethyl-1,4-phenylene)ether, poly(2-methyl-6-propyl-1,4-phenyl)ether, poly(2-ethyl-6-propyl-1,4-phenylene) ether, poly(2,6-diphenyl-1,4-phenylene)ether, copolymer of poly (2,6-dimethyl-1,4-phenylene)ether and poly(2,3,6-trimethyl-1,4-phenylene)ether, and copolymer of poly(2,6-dimethyl-1,4-phenylene)ether and poly(2,3,5-triethyl-1,4-phenylene)ether can be used.

Preferably, copolymer of poly(2,6-dimethyl-1,4-phenylene)ether and poly(2,3,6-trimethyl-1,4-phenylene)ether, and poly(2,6-dimethyl-1,4-phenylene)ether are preferably used, more preferably poly(2,6-dimethyl-1,4-phenylene) ether is used.

The degree of polymerization of polyphenylene ether is not limited specifically, but considering heat-stability or processability of the resin composition, it is preferable that the intrinsic viscosity of polyphenylene ether is in the range of from 0.2 to 0.8 when measured in a chloroform solvent at 25° C.

The content of the rubber-modified styrene-containing resin (A) used in the present invention is 20~95 parts by weight, more preferably, 40~95 parts by weight. The content of the polyphenylene ether resin (B) is 5~80 parts by weight, more preferably, 5~60 parts by weight.

Other additives may be used in the thermoplastic resin compositions of the present invention. The additives include a flame retardant, an anti-dripping agent, an impact modifier, a plasticizer, an inorganic filler, a heat stabilizer, an anti-oxidant, a compatibilizer, a light stabilizer, and a pigment and/or a dye. The inorganic filler is asbestos, glass fiber, talc, ceramic, and sulphate. The additives are employed in the amount of 0 to 50 parts by weight on the basis of 100 parts by weight of the base resin.

The invention may be better understood by reference to the following examples that are intended for the purpose of illustration and are not to be construed as in any way limiting the scope of the present invention, which is defined in the claims appended hereto.

EXAMPLES

The components to prepare the thermoplastic resin compositions in Examples 1~3 and Comparative Examples 1~5 are as follows:

(A) Rubber-Modified Styrene-Containing Resin ($a_1$) Styrene-Containing Graft Copolymer Resin ($a_{11}$) Styrene-Containing Graft Copolymer Resin Containing 0% of Acrylonitrile 50 parts of butadiene rubber latex powder, 50 parts of styrene and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain graft latex. To the graft latex, 0.4 parts of sulfuric acid was added, coagulated and dried to obtain styrene-containing graft copolymer resin containing 0% of acrylonitrile ($a_{11}$) in a powder form.

($a_{12}$) Styrene-Containing Graft Copolymer Resin Containing 5% of Acrylonitrile 50 parts of butadiene rubber latex powder, 47.5 parts of styrene, 2.5 parts of acrylonitrile, and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain graft latex. To the graft latex, 0.4 parts of sulfuric acid was added, coagulated and dried to obtain styrene-containing graft copolymer resin containing 5% of acrylonitrile ($a_{12}$) in a powder form.

($a_{13}$) Styrene-Containing Graft Copolymer Resin Containing 15% of Acrylonitrile 50 parts of butadiene rubber latex powder, 42.5 parts of styrene, 7.5 parts of acrylonitrile, and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain graft latex. To the graft latex, 0.4 parts of sulfuric acid was added, coagulated and dried to obtain styrene-containing graft copolymer resin containing 15% of acrylonitrile ($a_{13}$) in a powder form.

($a_{14}$) Styrene-Containing Graft Copolymer Resin Containing 24% of Acrylonitrile 50 parts of butadiene rubber latex powder, 38 parts of styrene, 12 parts of acrylonitrile, and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain graft latex. To the graft latex, 0.4 parts of sulfuric acid was added, coagulated and dried to obtain styrene-containing graft copolymer resin containing 24% of acrylonitrile ($a_{14}$) in a powder form.

($a_2$) Styrene-Containing Copolymer Resin ($a_{21}$) GPPS (General Purpose Polystyrene)

GPPS by Cheil Industries Inc. of Korea (product name: HF-2680) with a weight average molecular weight of 210,000 was used.

($a_{22}$) Rubber-Reinforced Styrene-Containing Resin (HIPS: High Impact Polystyrene)

Rubber-reinforced styrene-containing resin by Cheil Industries Inc. of Korea (product name: HG-1760S) containing 7% by weight of butadiene rubber with a particle size of 0.4 μm was used.

(B) Polyphenylene Ether (PPE)

Poly(2,6-dimethyl-phenyl ether) by Asahi Kasei Co. of Japan (product name: P-402) was used.

(C) Phosphoric Acid Ester

Triphenylphosphate (TPP) with a melting point of 48° C. was used for a flame retardant.

The components (A), (B) and (C) as shown in Table 1 were blended and extruded in the form of pellets with a conventional twin-screw extruder at 200~280° C. The pellets were dried at 80° C. for 3 hours and extruded into test specimens in a 6 oz. extruder at molding temperature of 180~280° C. and barrel temperature of 40~80° C., and the resin pellets were molded into test specimens. Impact strength of the test specimens of the Examples and Comparative Examples was measured according to Izod impact strength ASTM D-256 (⅛" notched). Melt Flow index(g/10 min) was measured according to ASTM D-1238(220° C., 10 kg). Gloss was measured according to ASTM D-523 with a 60 degrees viewing angle. The test results are shown in Table 1.

TABLE 1

|   |   |   | Examples | | | Comparative Examples | | | | |
|---|---|---|---|---|---|---|---|---|---|---|
|   |   |   | 1 | 2 | 3 | 1 | 2 | 3 | 4 | 5 |
| (A) | ($a_1$) | ($a_{11}$) | — | — | — | 20 | — | — | — | — |
|   |   | ($a_{12}$) | 20 | 20 | 20 | — | — | — | — | — |
|   |   | ($a_{13}$) | — | — | — | — | 20 | — | — | — |
|   |   | ($a_{14}$) | — | — | — | — | — | 20 | — | — |
|   | ($a_2$) | ($a_{21}$) | 25 | 50 | — | 25 | 25 | 25 | 70 | — |
|   |   | ($a_{22}$) | 25 | — | 50 | 25 | 25 | 25 | — | 70 |
| (B) |   |   | 30 | 30 | 30 | 30 | 30 | 30 | 30 | 30 |
| (C) |   |   | 10 | 10 | 10 | 10 | 10 | 10 | 10 | 10 |
| Gloss (%) |   |   | 94 | 95 | 93 | 95 | 90 | 85 | 97 | 90 |
| Izod Impact strength (⅛") |   |   | 35 | 30 | 38 | 30 | 25 | 23 | 14 | 20 |
| Melt Flow Index (g/mL) |   |   | 33 | 35 | 30 | 25 | 25 | 20 | 45 | 25 |

As shown in Examples 1~3, the resin composition of the present invention had good impact strength and surface gloss due to styrene-containing graft copolymer resin containing 5% of acrylonitrile ($a_{12}$). As shown in Comparative Examples 4~5, the resin compositions which do not contain styrene-containing graft copolymer resin ($a_1$) show good gloss, but poor impact strength. Comparative Example 1 employing styrene-containing graft copolymer resin containing 0% of acrylonitrile ($a_{11}$) showed low melt flow index. Comparative Examples 2~3 employing styrene-containing graft copolymer resin containing more than 15% by weight of acrylonitrile showed poor impact strength. As described above, the resin composition of the present invention can obtain good mechanical properties and surface gloss by adding styrene-containing graft copolymer resin containing 0.5-10% of acrylonitrile.

The present invention can be easily carried out by an ordinary skilled person in the art. Many modifications and changes may be deemed to be with the scope of the present invention as defined in the following claims.

What is claimed is:

1. A thermoplastic resin compositions comprising:
   (A) 20~95 parts by weight of a rubber-modified styrene-containing resin composed of
      ($a_1$) 10~60% by weight of a styrene-containing graft copolymer resin containing 10~60% by weight of a rubber and 90~40% by weight of a styrene-acrylonitrile copolymer, wherein the styrene-acrylonitrile copolymer contains 0.5~10% by weight of acrylonitrile, and
      ($a_2$) 90~40% by weight of a polystyrene resin containing 0~20% by weight of a rubber; and
   (B) 5~80 parts by weight of a polyphenylene ether.

2. The thermoplastic resin compositions as defined in claim 1, wherein said polystyrene resin ($a_2$) is selected from the group consisting of a polystyrene resin which does not contain rubber, a rubber-reinforced polystyrene, and a mixture thereof.

3. The thermoplastic resin compositions as defined in claim 1, wherein said polystyrene resin ($a_2$) is selected from the group consisting of a polystyrene, a rubber-reinforced polystyrene, and a mixture thereof.

4. The thermoplastic resin compositions as defined in claim 1, wherein said polyphenylene ether resin (B) is poly(2,6-dimethyl-1,4-phenylene)ether.

5. The thermoplastic resin compositions as defined in claim 1, wherein said styrene-containing graft copolymer resin ($a_1$) contains 0.5~7% by weight of acrylonitrile.

6. The thermoplastic resin compositions as defined in claim 1, wherein said styrene-containing graft copolymer resin ($a_1$) contains 1~5% by weight of acrylonitrile.

7. The thermoplastic resin compositions as defined in claim 1, wherein said resin composition comprises 40~95 parts by weight of rubber-modified styrene-containing resin (A) and 5~60 parts by weight of polyphenylene ether (B).

8. The thermoplastic resin compositions as defined in claim 1, wherein said resin composition further comprises a flame retardant, an anti-dripping agent, an impact modifier, a plasticizer, an inorganic filler, a heat stabilizer, an antioxidants, a light stabilizer, a pigment, and/or a dye.

9. A thermoplastic resin compositions comprising:
   (A) 20~95 parts by weight of a rubber-modified styrene-containing resin composed of
      ($a_1$) 10~60% by weight of a styrene-containing graft copolymer resin containing 10~60% by weight of a rubber and 90~40% by weight of a styrene-methacrylonitrile copolymer, wherein the styrene-methacrylonitrile copolymer contains 0.5~10% by weight of methacrylonitrile, and
      ($a_2$) 90~40% by weight of a polystyrene resin containing 0~20% by weight of a rubber; and
   (B) 5~80 parts by weight of a polyphenylene ether.

10. The thermoplastic resin compositions as defined in claim 9, wherein said polystyrene resin ($a_2$) is selected from the group consisting of a polystyrene resin which does not contain rubber, a rubber-reinforced polystyrene, and a mixture thereof.

11. The thermoplastic resin compositions as defined in claim 9, wherein said polyphenylene ether resin (B) is poly(2,6-dimethyl-1,4-phenylene)ether.

12. The thermoplastic resin compositions as defined in claim 9, wherein said styrene-containing graft copolymer resin ($a_1$) contains 0.5~7% by weight of methacrylonitrile.

13. The thermoplastic resin compositions as defined in claim 9, wherein said styrene-containing graft copolymer resin ($a_1$) contains 1~5% by weight of methacrylonitrile.

14. The thermoplastic resin compositions as defined in claim 9, wherein said resin composition comprises 40~95 parts by weight of rubber-modified styrene-containing resin (A) and 5~60 parts by weight of polyphenylene ether (B).

15. A thermoplastic resin compositions comprising:
  (A) 2~95 parts by weight of a rubber-modified styrene-containing resin composed of
    ($a_1$) 10~60% by weight of a styrene-containing graft copolymer resin containing 10~60% by weight of a rubber and 90~40% by weight of a styrene-acrylonitrile copolymer containing 0.5~10% by weight of acrylonitrile or a styrene-methacrylonitrile copolymer containing 0.5~10% by weight of methacrylonitrile, and
    ($a_2$) 90~40% by weight of a polystyrene resin which contains 0% by weight of a rubber; and
  (B) 5~80 parts by weight of a polyphenylene ether.

16. The thermoplastic resin compositions as defined in claim 15, wherein said polyphenylene ether resin (B) is poly(2,6-dimethyl-1,4-phenylene)ether.

17. The thermoplastic resin compositions as defined in claim 15, wherein said styrene-containing graft copolymer resin ($a_1$) contains a styrene-acrylonitrile copolymer containing 0.5~7% by weight of acrylonitrile or a styrene-methacrylonitrile copolymer containing 0.5~7% by weight of methacrylonitrile.

18. The thermoplastic resin compositions as defined in claim 15, wherein said styrene-containing graft copolymer resin ($a_1$) contains a styrene-acrylonitrile copolymer containing 1~5% by weight of acrylonitrile or a styrene-methacrylonitrile copolymer containing 1~5% by weight of methacrylonitrile.

19. The thermoplastic resin compositions as defined in claim 15, wherein said resin composition comprises 40~95 parts by weight of rubber-modified styrene-containing resin (A) and 5~60 parts by weight of polyphenylene ether (B).

20. A thermoplastic resin compositions comprising:
  (A) 20~95 parts by weight of a rubber-modified styrene-containing resin composed of
    ($a_1$) 10~60% by weight of a styrene-containing graft copolymer resin prepared by copolymerizing 10~60% by weight of a rubber with 90~40% by weight of a monomer mixture of 90~99.5% by weight of an aromatic vinyl monomer and 0.5~10% by weight of acrylonitrile or methacrylonitrile, and
    ($a_2$) 90~40% by weight of a polystyrene resin prepared by adding 80~100% by weight of an aromatic alkenyl compounds to 0~20% by weight of a rubber and polymerizing the resulting mixture using one or more of benzoylperoxide, t-butyl hydroperoxide, acetyl peroxide, or cumene hydroperoxide as initiators, and
  (B) 5~80 parts by weight of a polyphenylene ether.

* * * * *